United States Patent [19] [11] 4,268,752
Herwig et al. [45] May 19, 1981

[54] OPTICAL ARRANGEMENT FOR A PASSIVE INFRARED MOTION DETECTOR

[75] Inventors: Thomas Herwig, Eltville; Gerhard Doenges, Taunusstein, both of Fed. Rep. of Germany

[73] Assignee: Heimann GmbH, Fed. Rep. of Germany

[21] Appl. No.: 40,652

[22] Filed: May 21, 1979

[30] Foreign Application Priority Data

Feb. 7, 1979 [DE] Fed. Rep. of Germany ....... 2904654

[51] Int. Cl.³ ................................................ G01J 1/00
[52] U.S. Cl. ...................................... 250/353; 250/342; 250/347
[58] Field of Search ............... 250/353, 347, 342, 334, 250/338; 350/1.4, 303

[56] References Cited

U.S. PATENT DOCUMENTS 3,703,718 11/1972 Berman .......................... 250/338 X
4,084,092 4/1978 Runciman ....................... 250/353 X

FOREIGN PATENT DOCUMENTS 869369 11/1978 Belgium .
2103909 of 1971 Fed. Rep. of Germany .
2734157 of 1977 Fed. Rep. of Germany .
1335410 10/1973 United Kingdom .

*Primary Examiner*—Davis L. Willis
*Attorney, Agent, or Firm*—Hill, Van Santen, Steadman, Chiara & Simpson

[57] ABSTRACT

An optical arrangement for a passive infrared motion detector which has an infrared detector unit and a system for directing infrared radiation from at least two separate directions to be monitored onto the detector unit characterized by the system including a single focusing device and separate, flat reflecting surfaces or directing mirrors, which are arranged with at least one flat reflecting surface associated with each direction to be monitored to reflect a beam or solid angle of radiation from the direction onto the single focusing device which device will focus the radiation along a folded beam path to the detector unit.

8 Claims, 4 Drawing Figures

OPTICAL ARRANGEMENT FOR A PASSIVE INFRARED MOTION DETECTOR

BACKGROUND OF THE INVENTION

Field of the Invention

The present invention is related to an arrangement for a passive infrared motion detector in which a plurality of reflecting surfaces are arranged to direct beams of infrared radiation coming from a plurality of separate directions and focus these beams on a detector.

An optical arrangement for reflecting and focusing separate beams of infrared radiation, which are coming from a plurality of separate directions to be monitored, onto an infrared detector is known and examples are described in German AS No. 21 03 909, which corresponds to British Pat. No. 1,335,410. The infrared motion detector will register the intrusion of a person into a space, that is being monitored, or an object moving in the space by detecting the disturbance of the infrared radiation of the background which is caused by the moving object or intrusion. An electronic device evaluates the characteristic change of the infrared radiation applied to the detector and this evaluation can be used to actuate an alarm.

For a signal disturbance interval, which is as large as possible, the space is divided into a plurality of fields of view, lens coverage areas, or monitoring areas so that the monitoring areas are separated by dark field areas with both areas being solid angles with the monitoring areas being taken in by the detector and the dark field areas not being monitored. The motion of an object to be registered from a monitored area into a dark field area and vice versa will cause an evaluatable change of the infrared radiation striking the detector.

According to the above mentioned British patent (German patent), the division of the space to be monitored into a plurality of monitoring means, fields of view or lens coverage is achieved with the assistance of either a compound optic or using a cone shell-shaped mirror aperture, which marks out a compass or circular band of space to be monitored. Small concave mirrors or respectively sections of concave mirrors, which have a relatively short focal length, are arranged to focus on a common point at which the detector unit is positioned. Each of these concave mirrors covers radiation from a given direction to be monitored separate or lens coverage area or field of view. Such a compound optic has a few disadvantages which are as follows:

1. The greatest angle, which can be monitored with a compound optic, is approximately 90° because the angle of incidence of radiation on the detector unit is approximately the same as the angle of incidence into the device and because the standard detector unit only supplies small signals when receiving radiation from a large angle of incidence. However, it is often desirable for many uses to be able to monitor a significantly larger angular range than 90°.

2. Because of the short focal length, the electrical signal generated by the detector greatly depends on the distance of the body that is being detected from the detector unit. When the amplification is adjusted in such a manner that sufficient signals are still received for great distances, the close range is strongly overweighted so that thermal disturbances immediately in front of the device, which disturbances may be caused by insects flying by the device or rising warm air, could lead to a false alarm under unfavorable conditions. In order to increase the focal length of the compound optics, the housing dimensions for the device would have to be greatly enlarged; and 3. Another disadvantage of the compound optics is the crossing over of the radiation bundles or beams from various lens coverage areas or fields of view. The locally excessive sensitivity at such cross over points further increases the danger of a false alarm as discussed hereinabove. Although the cross over points could be positioned behind the front plate and within the interior of the housing of the device, the radiation bundles would still lie close to one another immediately in front of the front plate of the housing so that a thermal disturbance could easily fall into a number of lens coverage areas at the same time and, therefore, could trigger a false alarm.

SUMMARY OF THE INVENTION

The present invention is to provide a beam guidance for a motion detector in such a manner that the disadvantages of the compound optics described hereinabove are avoided. The totality of the fields of view is to be able to cover a larger solid angle than the aperture angle of the known detectors. In addition, the object is to provide individual fields of view which do not intersect one another and to provide as large a focal length as possible without having to increase the overall length or size of the housing of the device.

In order to achieve these objects, the present invention is directed to an improvement in a passive infrared motion detector having an infrared detector unit and means for directing infrared radiation from at least two separate directions to be monitored onto the detector unit. The improvement comprises the means for directing including a single means for focusing radiation and separate, flat reflecting surfaces, said flat reflecting surfaces being arranged with at least one reflecting surface associated with each direction to be monitored to reflect the radiation from said direction onto said single means for focusing radiation, said means for focusing radiation directing the focused radiation along a folded beam path to the infrared detector unit. Thus, the improvement of the present invention provides the following features: separation of the beam division or direction and the beam focusing; reflecting surfaces which are flat directing or reflecting surfaces such as mirrors; the mirrors directing the reflected beam to a single focusing system and the focusing system focusing the received beam along a folded beam path onto the detector unit.

The functional separation of the beam division and beam focusing produces a high degree of freedom on the one hand to direct beams via any desired arrangement of director mirrors from the monitored directions onto the focusing system given any desired meridional and azimuthal angles with a small solid angle per monitor direction and, on the other hand, to design this single focusing system or means for focusing radiation as desired according to the requirements for the sensitivity and focal length. The individual fields of view can be kept completely free of cross over. With the folded beam path, the focusing system enlarges the focal length via a reflecting mirror without having to enlarge the housing of the detector. The detector unit is irradiated only under relatively small angles. In commercially available detector units with a limited field of vision, this leads to a high utilization factor of the incidence radiation. Finally, the folded beam path provides the opportunity of placing the detector unit outside of the optical axis at a location which is electrically and thermally well screened.

While specific portions of the improvement such as the separation of the beam director and the beam focusing means and also the provision of a beam focusing means having a folded path were each separately disclosed in Peter-Wilhelm Steinhage, U.S. patent application Ser. No. 924,163 filed July 13, 1978, which U.S. application is based on German patent application No. P 27 34 157.7, and these separate features were known with regard to coating of the focus mirror from a corresponding Belgium Pat. No. 869,369, neither of these references understood the significance of combining these two features for an improvement in a passive infrared motion detector.

When determining or selecting the focal length, the following considerations are valid. The device should be able to reliably detect an intruder with a width D up to a predetermined so-called "safe range" R whereby the signal height should be independent of the distance when the distance is in a range of $0 \leqq r \leqq R$. The effective range depends on the penetration speed and on the temperature difference between the intruder and the background radiation. In general, the range is significantly larger than R. The independence from the distance is achieved in that the width of the fields of view or lens coverage area and the width of the intruder coincide precisely at a distance R. At a distance $r \leqq R$, the increase of the radiation strength is compensated according to $r^{-2}$ law by means of the change of the partial surface of the intruder located in the fields of view or lens coverage area. For a distance $r > R$, the signal at first proportionally decreases to $(r-R)^{-1}$, as long as the intruder still fills out the measuring field in the vertical direction. At a distance which is even further increased, a guadratic signal decrease will occur. The optimum focal length is calculated according to the formula $f = d \cdot R/D$ wherein d = effective diameter of the detector, R = "safe range", D = width of the intruder. For example, with D = 40 cm, R = 8 m and d = 3.5 mm, an optimum focal length f = 70 mm occurs.

In an embodiment, the focusing system contains a concave mirror. The flat director mirrors, which are in a louver-like arrangement, projector direct the corresponding beams from the directions to be monitored on the concave mirror. The same amount and type of surface portion of the hollow or concave mirror should be available for each partial ray bundle so that the same response sensitivity is valid for all fields of view or lens coverage areas. In addition, the surface of each of the director mirrors should project the same size area onto a plane perpendicular to the optical axis so that for all lens coverage areas or fields of view are the same area or size. For the case in which the director mirror lies between the monitored space and the detector, an opening between individual director mirrors having a surface-wise area equal to the director mirrors is provided for a bundle of rays extending along the optical axis. The director mirrors and thus the position of the individual lens coverage areas or fields of view can be adjustable. In addition, the inventive arrangement offers the possibility of covering individual director mirrors and making the corresponding lens coverage area or fields of view a dark field. Thereby, the monitoring areas of a device can be optimally adjusted to a specific condition of the space to be monitored. For example, the director mirrors are placed in such a manner that a monitoring area which is unsymmetrical with respect to the optical axis will occur and the motion detector can be placed in a corner of the space to be monitored. A specific development of the director mirror consists wherein they extend parallel to a direction which is perpendicular to the optical axis and their longitudinal axes are parallel to each other.

According to another embodiment, the focusing system or means contains a concave mirror and the director mirrors are a mirror arrangement with flat surface facets to project the beams from different monitor directions or fields of view. This mirror arrangement is preferably placed in the interior of the housing which has a corresponding opening for each individual field of view which is being monitored. In a further development, a deflection mirror is situated between the concave mirror and the detector. Such an arrangement can be advantageously employed with a vertical optical axis when a vertical overall angle $<45°$ is to be monitored.

DESCRIPTION OF THE PREFERRED EMBODIMENTS

Figure 1:
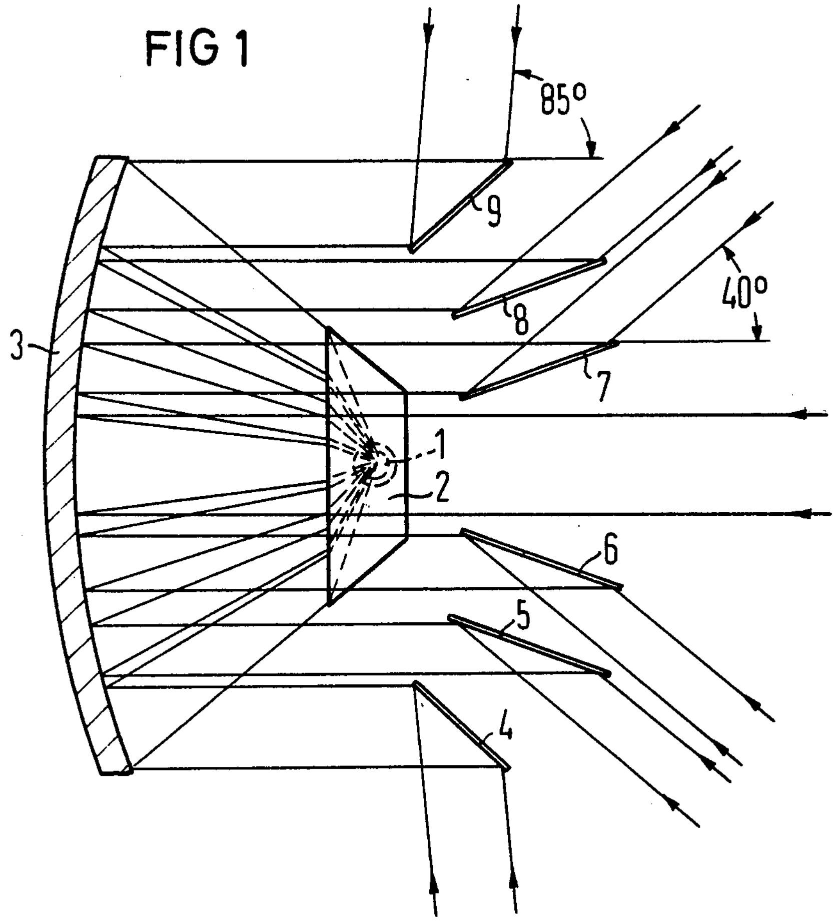
FIG. 1 is a plan view of a detector in accordance with the present invention having beam directors arranged in a louver-type pattern.
Figure 2:
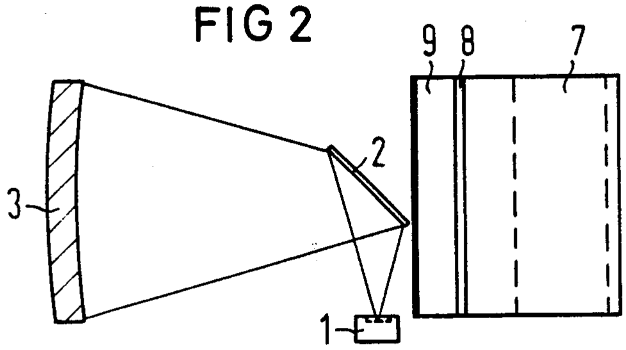
FIG. 2 is a side view with portions in cross section.

The principles of the present invention are particularly useful in a passive infrared motion detector illustrated in FIGS. 1 and 2. The passive motion detector includes means for detecting comprising a detector unit 1 and means for directing infrared radiation which includes a single means for focusing radiation and separate, first reflecting surfaces. The single means for focusing radiation includes a flat deflector mirror 2 and a concave mirror 3. The flat director surfaces are illustrated in FIGS. 1 and 2 as flat director mirrors 4–9 which are arranged in a louver-type pattern with their longitudinal axes being parallel to each other and the surfaces extending parallel to a perpendicular to the optical axis of the device. The individual mirror surfaces of the directors 4–9 are rectangular in shape while the deflection mirror 2 has a trapezoidal shape.

The deflector mirror 2 and the concave mirror 3 form a Newtonian mirror lens with which the rays coming from the director mirrors 4–9 are focused onto the detector 1. Beam division is carried out with the director mirrors 4–9. Ray bundles from five directions or fields of view as illustrated in FIG. 1 cover an overall angle of 170° and are transformed by means of director mirrors 4–9 into axially parallel ray bundles and are directed as such onto the concave mirror 3. In order to keep the overall depth small, the director mirrors 5 and 6 are parallel to one another and augment one another and are for an angle of approximately 40° to the optical axis. Mirrors 7 and 8 are the same but for a different direction. Rays from a field of view that extend parallel to optical axis are directed straight at the concave mirror 3 between the mirrors and primarily between mirrors 6 and 7. The director mirror 9 as well as the mirror 4, which are symmetrically arranged, provide coverage for beams extending at an angle of approximately 85° to the optical axis. The director mirrors 4–9 are arranged with sufficient intermediate space in such a manner that each ray bundle to be picked up by the mirror strikes the particular director mirror with sufficient width through a respective separate housing window of a housing (not illustrated). Individual windows can be covered without further ado when the respective employment of the device so requires. The vertical aperture angle of the individual fields of view are determined by means of the vertical position of the director mirrors 4–9 and by means of the optical distance from the detector 1 or, respectively, by means of the distance of the total optical parts from one another.

The position of the detector unit 1 with respect to the concave mirror 3 and due to the deflection of the focused beam from the mirror 3 by the mirror 2 is best illustrated in FIG. 2. The deflection mirror bends the optical axis from a substantially horizontal direction to a vertical direction onto the detector unit 1. Such bending or folding of the axis enables the use of a longer focal length within a housing of a smaller size.

Figure 3:
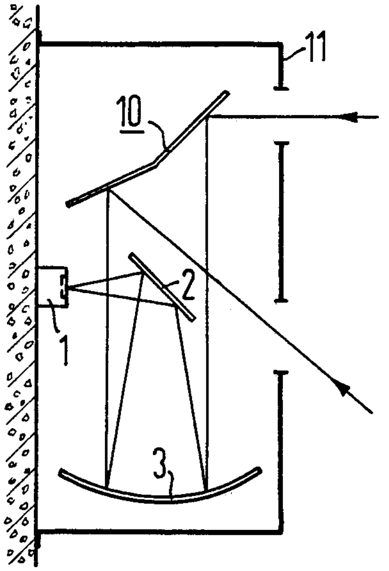
FIG. 3 is a cross-sectional side view of an embodiment of the device in accordance with the present invention.
Figure 4:
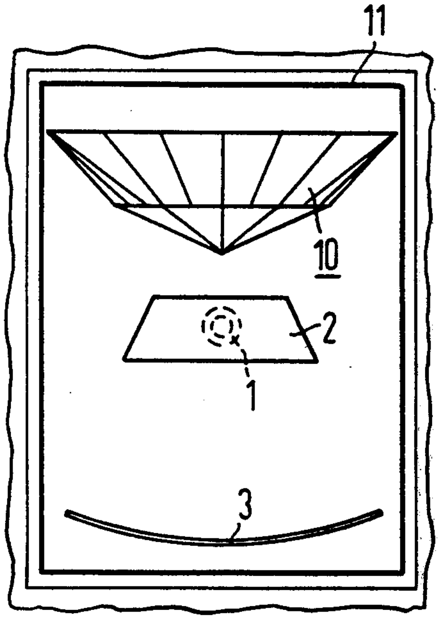
FIG. 4 is a cross-sectional end view of the device of FIG. 3.

An embodiment of the invention is illustrated in FIG. 3 and in this embodiment, the directing of the individual beams is accomplished by means of a mirror arrangement having facet surfaces instead of utilizing a louver-type beam division arrangement. The facet surfaces also enable the direction of beams having different vertical angles as well as beams having horizontal angles so that a suitable coverage of up to about 45° in the vertical direction is possible in addition to the angle of coverage in a horizontal plane.

The mirror arrangement 10 having the individual facet-type surfaces directs the various beams onto the concave mirror 3 which focuses the beams and reflects them on the deflector mirror 2 which folds the focused beam and directs it onto the detector unit 1. In the embodiment illustrated, a housing 11 surrounds the director surfaces as well as the means for detecting and the means for focusing and this housing is illustrated as being attached to the wall which also supports the detector unit or means 1. As illustrated, two groups of openings are provided in the housing with a single opening from each group being shown. The first group of openings may be a horizontal slit or, respectively, a track of punched holes which are arranged to admit separate beams at different horizontal solid angles over a range of approximately 180°. The facet surface arrangement of the mirror 10 has an upper row of flat mirror to deflect or direct the individual beams entering the housing 11 through this group onto the mirror 3. These individual facets of the upper row for the horizontal beams are formed by flat mirrors which are connected convexly to one another and these individual mirrors have a trapezoidal shape. The mirror arrangement 10 has a lower row of triangular mirrors which receive individual beams from fields of view which extend at an angle of approximately 45° from the horizontal plane. This second group of beams enter the housing 11 through the second group of openings which may be a single slot or a series of punched holes. The two rows of mirrors direct their respective beams downward onto the concave mirror 3, the concave mirror then focuses the beam onto the deflector as the focused beam is folded or reflected through approximately 90° by the deflection mirror 2.

The detector unit 1 operates in the manner known in the prior art such as disclosed in the British reference or in the above United States patent application. In addition, the detector unit 1 is connected through an electrical system to operate an alarm in a known manner again illustrated by the British patent.

Although various minor modifications may be suggested by those versed in the art, it should be understood that we wish to embody within the scope of the patent granted hereon, all such modifications as reasonably and properly come within the scope of our contribution to the art.

We claim:

1. In a passive infrared motion detector having an infrared detector unit and means for directing infrared radiation from at least two separate directions to be monitored on said detector unit, the improvements comprising the means for directing including a single means for focusing radiation from more than two directions simultaneously and more than two separate, flat reflecting surfaces, said single means for focusing radiation including a single concave mirror having an optical axis and a deflecting mirror being arranged on the optical axis of the concave mirror and at an angle therein to deflect light focused by the concave mirror at an approximately a right angle to the optical axis and onto the infrared detector unit so that the focused radiation from said concave mirror travels to the detector unit in a folded path with two portions extending substantial at right angles to each other, said flat reflecting surfaces being a plurality of individual separate flat reflecting surfaces with at least one being arranged on each side of the optical axis of the concave mirror, said reflecting surfaces being arranged with at least one reflecting surface associated with each direction to be monitored to reflect the radiation simultaneously from said direction onto said concave mirror with at least two of the reflecting surfaces having planes extending at different angles to the optical axis.

2. In a passive infrared motion detector according to claim 1, wherein each of the flat reflecting surfaces is an individual separate, flat director mirror, said director mirrors being arranged in a louver-like pattern for reflecting beams from different directions at portions of the concave mirror.

3. In a passive infrared motion detector according to claim 2, wherein the director mirrors are adjustably mounted to enable changing the directing of the beams being directed onto the concave mirror.

4. In a passive infrared motion detector according to claim 2, wherein each of the flat director mirrors has a longitudinal axis extending parallel with each other and perpendicular to the optical axis of the concave mirror.

5. In a passive infrared motion detector according to claim 4, wherein each of the flat director mirrors is positioned between the space being monitored and the detector unit, and each of the mirrors is separated from adjacent mirrors by openings having equal areas with a longitudinal axis extending perpendicular with reference to the optical axis of the concave mirror.

6. In a passive infrared motion detector according to claim 5, wherein each of the flat director mirrors are adjustably mounted to rotate on their longitudinal axes.

7. In a passsive infrared motion detector according to claim 1, wherein the plurality of flat reflecting surfaces are provided on a member as flat mirror facets with a facet associated with each one of the directions being monitored.

8. In a passive infrared motion detector according to claim 7, wherein the deflecting mirror of the means for focusing radiation is arranged between the flat reflecting surfaces and the concave mirror.

* * * * *